United States Patent
Shin et al.

(10) Patent No.: US 8,644,636 B2
(45) Date of Patent: Feb. 4, 2014

(54) METHOD AND APPARATUS FOR REMOVING IMAGE BLOCKING ARTIFACT BY USING TRANSFORMATION COEFFICIENT

(75) Inventors: Gun-shik Shin, Suwon-si (KR); Jong-beom Ra, Daejeon (KR); Se-hyeok Park, Seoul (KR); Seok-bong Yoo, Seoul (KR); Jae-hyun Kim, Suwon-si (KR); Kyu-ha Choi, Suwon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 205 days.

(21) Appl. No.: 13/343,950

(22) Filed: Jan. 5, 2012

(65) Prior Publication Data
US 2012/0177301 A1 Jul. 12, 2012

Related U.S. Application Data

(60) Provisional application No. 61/431,176, filed on Jan. 10, 2011.

(30) Foreign Application Priority Data

Sep. 9, 2011 (KR) .................. 10-2011-0092222

(51) Int. Cl.
*G06K 9/40* (2006.01)
(52) U.S. Cl.
USPC ............ 382/264; 382/266; 382/268; 382/275

(58) Field of Classification Search
USPC ........ 348/666; 358/326; 375/E7.19; 382/264, 382/266, 268, 275
See application file for complete search history.

(56) References Cited

U.S. PATENT DOCUMENTS

| | | | |
|---|---|---|---|
| 6,317,522 B1 * | 11/2001 | Rackett | 382/268 |
| 6,760,487 B1 * | 7/2004 | Linares | 382/275 |
| 2005/0074178 A1 | 4/2005 | Montrone et al. | |
| 2005/0196063 A1 * | 9/2005 | Guangxi et al. | 382/261 |
| 2006/0029282 A1 * | 2/2006 | Meeker | 382/250 |
| 2006/0159351 A1 * | 7/2006 | Bae et al. | 382/233 |
| 2008/0101720 A1 | 5/2008 | Wang | |
| 2010/0027905 A1 | 2/2010 | Zhang et al. | |

OTHER PUBLICATIONS

Deqing Sun, et al., "Postprocessing of Low Bit-Rate Block DCT Coded Images Based on a Fields of Experts Prior", IEEE Transactions on Image Processing, vol. 16, No. 11, Nov. 2007, pp. 2743-2751.

(Continued)

*Primary Examiner* — Gregory F Cunningham
(74) *Attorney, Agent, or Firm* — Sughrue Mion, PLLC

(57) ABSTRACT

A method and apparatus for removing an image blocking artifact by using a transformation coefficient are provided. The method includes: detecting a first blocking artifact which is in a flat region of the input image; removing the first blocking artifact using a number of low frequency coefficients from among transformation coefficients for each transformation block of a plurality of transformation blocks of the input image, based on a result of detecting the first blocking artifact; detecting an edge region of the input image; and removing a second blocking artifact, which is in an edge region of an intermediate image obtained from the removing of the first blocking artifact of the input image, based on the detected edge region in the input image.

39 Claims, 8 Drawing Sheets

(56) References Cited

OTHER PUBLICATIONS

Hyun Wook Park, et al., "A Postprocessing Method for Reducing Quantization Effects in Low Bit-Rate Moving Picture Coding", IEEE Transactions on Circuits and Systems for Video Technology, vol. 9, No. 1, Feb. 1999, pp. 161-171.

Communication issued Jul. 23, 2012 by the International Searching Authority in counterpart International Application No. PCT/KR2011/010122.

* cited by examiner

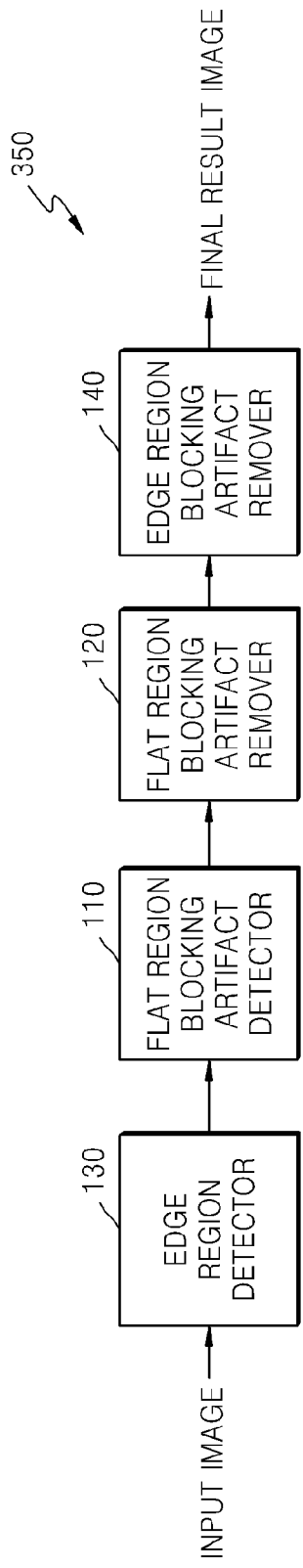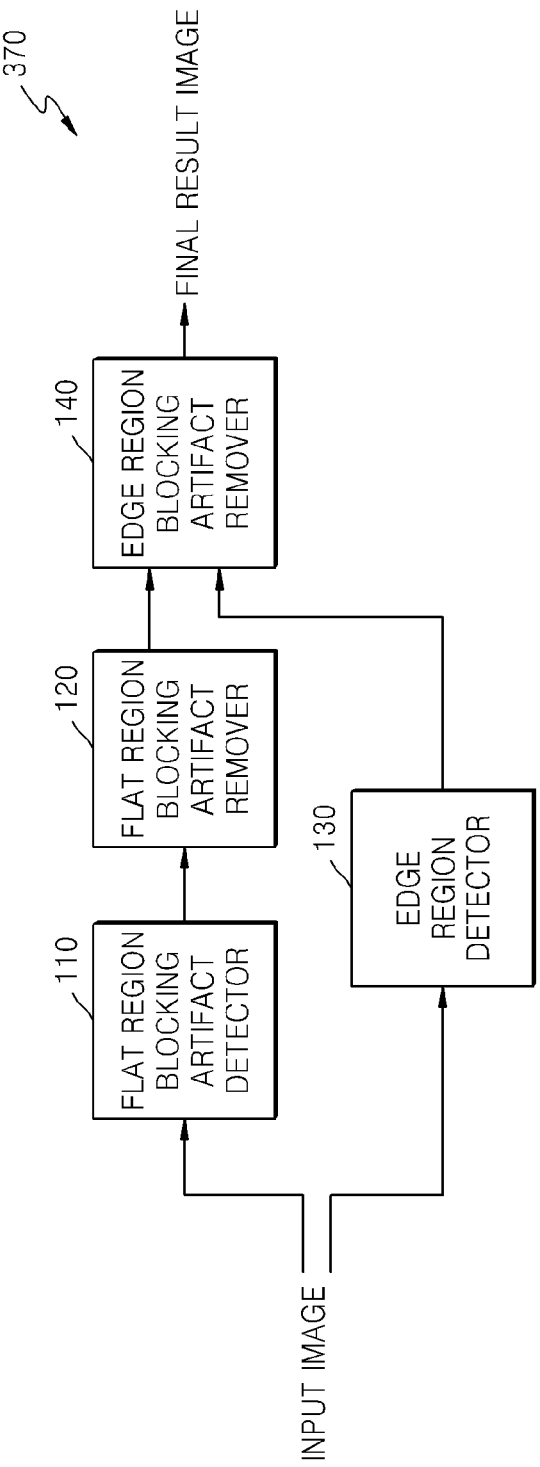

METHOD AND APPARATUS FOR REMOVING IMAGE BLOCKING ARTIFACT BY USING TRANSFORMATION COEFFICIENT

CROSS-REFERENCE TO RELATED PATENT APPLICATION

This application claims priority from U.S. Provisional Application No. 61/431,176, filed on Jan. 10, 2011, in the U.S. Patent and Trademark Office, and Korean Patent Application No. 10-2011-0092222, filed on Sep. 9, 2011 in the Korean Intellectual Property Office, the disclosures of which are incorporated herein in their entireties by reference.

BACKGROUND

1. Field

Apparatuses and methods consistent with exemplary embodiments relate to a block processing phenomenon due to image encoding, and more particularly, to removing image blocking artifacts generated during an image encoded process.

2. Description of the Related Art

Encoding and compression techniques are widely used to reduce data capacity for transmitting, receiving, and storing image data, and generally, a block-based encoding technique is used. However, image blocking artifacts may be generated in a restored image after decoding due to frequency conversion and quantization, and as a result, the quality of an image may deteriorate due to horizontal and vertical lattice noise.

Deblocking techniques may be used to reduce blocking artifacts generated during a block-based encoding process. Encoder-performed loop filtering, and post-processing filtering that does not change the structure of the encoder, are used as a common decoding technique. In the case of loop filtering, accurate deblocking is possible using encoding information about each frame. However, if deblocking is performed by an encoding system, encoding complexity will increase, as well as channel bandwidth usage. In the case of post-processing filtering, deblocking filtering is performed by a decoding terminal independently from an encoding system, after restoring an image. Consequently, calculation load of the encoding system is not increased. However, since deblocking is performed independently from the encoding and decoding processes, and after decoding is completed, encoding information used during the decoding process of an image is difficult to acquire and use during the deblocking operation.

SUMMARY

One or more exemplary embodiments may overcome the above disadvantages and other disadvantages not described above. However, one or more exemplary embodiments are not required to overcome the disadvantages described above, and may not overcome any of the problems described above.

According to an aspect of an exemplary embodiment there is provided a method of removing blocking artifacts in an input image, the method including: detecting a first blocking artifact, which is in a flat region of the input image; removing the first blocking artifact using a predetermined number of low frequency coefficients from among transformation coefficients for each transformation block of a plurality of transformation blocks of the input image, based on the detecting of the first blocking artifact; detecting an edge region of the input image; and removing a second blocking artifact, which is in an edge region of an intermediate image obtained from the removing of the first blocking artifact of the input image, based on the detected edge region in the input image.

The detecting of the first blocking artifact in the flat region may include: determining flat blocks in the input image; and detecting the first blocking artifact based on a blocking artifact strength of the flat blocks.

The first blocking artifact based on the blocking artifact strength of the flat blocks may include determining a current blocking artifact strength of a current flat block based on a difference between direct current coefficients of the current flat block and adjacent blocks from among the flat blocks.

The detecting of the first blocking artifact based on the blocking artifact strength of the flat blocks may include: determining local blocking artifact intensities of the flat blocks; determining a global blocking artifact strength of the input image based on an average of the local blocking artifact intensities of the flat blocks; and determining that the blocking artifact is generated in the flat region of the input image if the global blocking artifact strength exceeds a predetermined threshold value.

The removing of the first blocking artifact may include: determining the transformation coefficients according to pixels of the input image by transforming pixels in a block unit including a current pixel and having a predetermined size, for each of the pixels of the input image; and compensating for the predetermined number of low frequency coefficients from among the transformation coefficients according to pixels, for the each of the pixels of the input image.

The removing of the flat block artifact in the flat region may include: replacing the transformation coefficients according to blocks, which are obtained by dividing the input image in units of the transformation blocks and transforming pixels in each of the transformation blocks, with the compensated for low frequency coefficients; and generating an intermediate image in a spatial region by inverse transforming the transformation coefficients of the input image according to the transformation blocks.

The compensating for of the predetermined number of low frequency coefficients may include: generating low frequency coefficient images, in which low frequency coefficients from among the predetermined number of low frequency coefficients which are in a same coefficient location are arranged in an order of a corresponding block, for coefficient locations of the low frequency coefficients, by classifying the predetermined number of low frequency coefficients according to coefficient locations in the transformation blocks; and removing the first blocking artifact for each of the low frequency coefficient images generated according to the coefficient locations in the transformation blocks.

The replacing of the transformation coefficients according to blocks, which are obtained by dividing the input image in block units with the compensated for low frequency coefficients, may include: extracting low frequency coefficients of blocks in a same location as the transformation blocks of the input image, from among the compensated for low frequency coefficients; and replacing low frequency coefficients in a same location as the extracted low frequency coefficients, from among the low frequency coefficients of the transformation blocks of the input image, with the extracted low frequency coefficients.

The first blocking artifact may include determining a smoothing filtering strength for removing the first blocking artifact, for each of the flat blocks, based on the local blocking artifact intensities of the flat blocks, and removing the first blocking artifact based on the determined smoothing filtering strength.

The first blocking artifact may include determining a filtering strength of total variation filtering for removing the first blocking artifact based on the local blocking artifact intensities of the flat blocks, and removing the first blocking artifact by performing the total variation filtering based on the determined filtering strength.

The detecting of the edge region in the input image may include: generating a low frequency band image by inverse transforming an image that includes the predetermined number of low frequency coefficients for transformation blocks of the input image, wherein other coefficients are 0; and generating a high frequency band image by subtracting the low frequency band image from the input image.

The detecting of the edge region in the input image may further include determining a transformation block of which the energy of samples is higher than a predetermined threshold value from among transformation blocks of the high frequency band image, as an edge block.

The energy of samples may be an average of absolute values of the transformation coefficients of the transformation blocks or an average of absolute values of pixel values of the transformation blocks.

The removing of the second blocking artifact may include: grouping edge blocks forming a same edge, from among edge blocks of the edge region of the intermediate image, in correspondence to the edge region of the input image; performing a three-dimensional (3D) orthogonal transformation on the edge blocks in each group resulting from the grouping; and removing the second blocking artifact by using 3D transformation coefficients of the edge blocks in each group resulting from the grouping.

The removing of the blocking artifact of the edge blocks using the 3D transformation coefficients of the edge blocks in each group may include performing threshold filtering for transforming the 3D transformation coefficients to 0 if the 3D transformation coefficients are less than a predetermined threshold value.

The removing of the blocking artifact of the edge blocks using the 3D transformation coefficients of the edge blocks in each group may include: performing threshold filtering on the 3D transformation coefficients; restoring the edge blocks in each group by performing an inverse 3D orthogonal transformation on the 3D transformation coefficients on which the threshold filtering is performed; and updating the edge region detected in the intermediate image based on the restored edge blocks.

The updating of the edge region detected in the intermediate image based on the restored edge blocks may include updating the edge region by determining a weighted average block with respect to edge blocks in an overlapping region from among edge blocks restored by performing the 3D orthogonal transform, the threshold filtering, and the inverse 3D orthogonal transformation according to a plurality of groups.

The method may further include receiving the input image, wherein the input image is decoded and restored by a decoder.

According to an aspect of an exemplary embodiment there is provided an apparatus for removing image blocking artifacts in an input image, the apparatus including: a flat region blocking artifact detector that detects a first blocking artifact that is in a flat region of the input image; a flat region blocking artifact remover that removes the first blocking artifact by using a predetermined number of low frequency coefficients from among transformation coefficients according to blocks, for each of transformation blocks of the input image based on the result of detecting; an edge region detector that detects an edge region in the input image; and an edge region blocking artifact remover that removes a second blocking artifact, which is in an edge region of an intermediate image, obtained by removing the first blocking artifact of the input image, based on the detected edge region in the input image.

The flat region blocking artifact detector may determine flat blocks in the input image, and detect the first blocking artifact based on a blocking artifact strength of the flat blocks.

The flat region blocking artifact detector may determine a current blocking artifact strength of a current flat block based on a difference between direct current coefficients of the current flat block and adjacent blocks from among the flat blocks.

The flat region blocking artifact detector may: determine local blocking artifact intensities of the flat blocks; determine a global blocking artifact strength of the input image based on an average of the local blocking artifact intensities of the flat blocks; and determine that the blocking artifact is generated in the flat region of the input image if the global blocking artifact strength exceeds a predetermined threshold value.

The flat region blocking artifact remover may determine transformation coefficients according to pixels of the input pixels by transforming pixels in a block unit including a current pixel and having a predetermined size, for each of the pixels of the input image, and compensate for the predetermined number of low frequency coefficients from among the transformation coefficients for the each of the pixels of the input image.

The flat region blocking artifact remover may replace the transformation coefficients according to blocks with the compensated for low frequency coefficients, for the transformation blocks of the input image, and generate an intermediate image in a spatial region by inverse transforming the transformation coefficients of the input image for each of the transformation blocks.

The flat region blocking artifact remover may generate low frequency coefficient images, in which low frequency coefficients from among the predetermined number of low frequency coefficients which are in a same coefficient location are arranged in an order of a corresponding block, for coefficient locations of the low frequency coefficients, by classifying the predetermined number of low frequency coefficients according to coefficient locations in the transformation blocks, and remove the first blocking artifact in flat blocks for each of the low frequency coefficient images generated according to the coefficient locations.

The flat region blocking artifact remover may extract low frequency coefficients of blocks in a same location as the transformation blocks of the input image, from among the compensated for low frequency coefficients, and replace low frequency coefficients in a same location as the extracted low frequency coefficients, from among the low frequency coefficients of the transformation blocks of the input image, with the extracted low frequency coefficients.

The flat region blocking artifact remover may determine a smoothing filtering strength for removing the blocking artifact according to the flat blocks based on the local blocking artifact intensities of the flat blocks, and remove the first blocking artifact based on the determined smoothing filtering strength.

The flat region blocking artifact remover may determine a filtering strength of total variation filtering for removing the first blocking artifact based on the local blocking artifact intensities of the flat blocks, and remove the first blocking artifact by performing the total variation filtering based on the determined filtering strength.

The edge region detector may generate a low frequency band image by inverse transforming an image that includes the predetermined number of low frequency coefficients for transformation blocks of the input image, wherein other coefficients are 0, and generate a high frequency band image by subtracting the low frequency band image from the input image.

The edge region detector may determine a transformation block of which the energy of samples is higher than a predetermined threshold value from among transformation blocks of the high frequency band image, as an edge block.

The energy of samples may be an average of absolute values of the transformation coefficients of the transformation blocks or an average of absolute values of pixel values of the transformation blocks.

The edge region blocking artifact remover may group edge blocks forming a same edge, from among edge blocks of the edge region of the intermediate image, in correspondence to the edge region of the input image, perform a three-dimensional (3D) orthogonal transformation on the edge blocks in each group grouped by the edge region blocking artifact remover, and remove the blocking artifact of the edge blocks by using 3D transformation coefficients of the edge blocks in each group grouped by the edge region blocking artifact remover.

The edge block blocking artifact remover may perform threshold filtering for transforming the 3D transformation coefficients to 0 if the 3D transformation coefficients are less than a predetermined threshold value.

The edge block blocking artifact remover may perform threshold filtering on the 3D transformation coefficients; restores the edge blocks in each group by performing an inverse 3D orthogonal transformation on the 3D transformation coefficients on which the threshold filtering is performed, and updates the edge region detected in the intermediate image based on the restored edge blocks.

The edge block blocking artifact remover may update the edge region by determining a weighted average block with respect to edge blocks in an overlapping region from among edge blocks restored by performing the 3D orthogonal transform, the threshold filtering, and the inverse 3D orthogonal transformation according to a plurality of groups.

The input image may be decoded and restored by a decoder.

An aspect of an exemplary embodiment provides a computer-readable recording medium having recorded thereon a program for executing a method of removing blocking artifacts in an input image, the method including: detecting a first blocking artifact, which is in a flat region of the input image; removing the first blocking artifact using a predetermined number of low frequency coefficients from among transformation coefficients for each transformation block of a plurality of transformation blocks of the input image, based on the detecting of the first blocking artifact; detecting an edge region of the input image; and removing a second blocking artifact, which is in an edge region of an intermediate image obtained from the removing of the first blocking artifact of the input image, based on the detected edge region in the input image.

According to an aspect of an exemplary embodiment there is provided a method of removing blocking artifacts in an input image, the method including: detecting at least one first blocking artifact, which is in a flat region of the input image, based on a first threshold comparison; transforming blocks of the input image, wherein the transforming generates transformation coefficients for each transformed block of the input image; extracting a predetermined number of low frequency coefficients from among the transformation coefficients generated from the transforming; generating low frequency coefficient images based on the extracted predetermined number of low frequency coefficients; generating compensated low frequency coefficient images by filtering the at least one first blocking artifact from the generated low frequency coefficient images; extracting compensation coefficients from the compensated low frequency coefficient images; and generating an intermediate image by inverse transforming the compensated low frequency coefficient images.

The method may further include: detecting at least one edge block in the intermediate image based on a second threshold comparison; performing a three-dimensional (3D) transformation on groups of edge blocks, which form a same edge, from among the at least one edge block detected in the intermediate image; filtering 3D transformation coefficients resulting from the 3D transformation; performing an inverse 3D transformation based on a result of the filtering of the 3D transformation coefficients; and generating a final image based on the performing of the inverse 3D transformation.

BRIEF DESCRIPTION OF THE DRAWINGS

The above and other features will become more apparent by describing in detail exemplary embodiments with reference to the attached drawings in which:

FIGS. 3B and 3C are block diagrams respectively of apparatuses for removing an image blocking artifact, according to other exemplary embodiments;

DETAILED DESCRIPTION

Hereinafter, exemplary embodiments will be described more fully with reference to the accompanying drawings.

Figure 1:
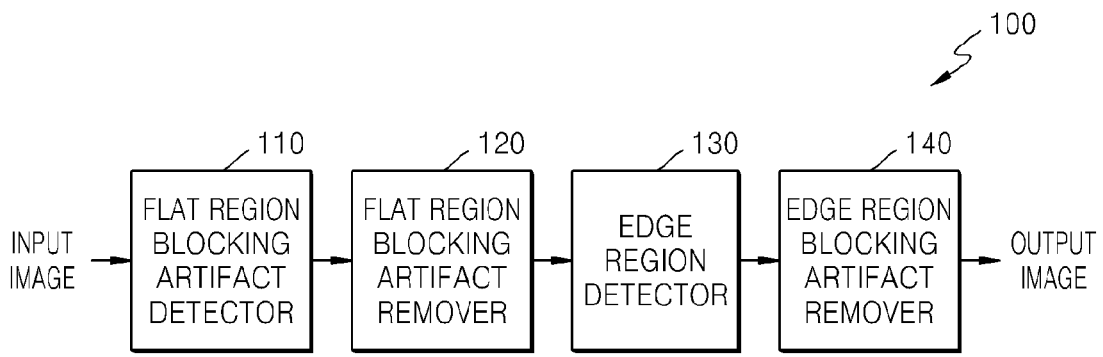
FIG. 1 is a block diagram of an apparatus for removing an image blocking artifact by using a transformation coefficient, according to an exemplary embodiment.

FIG. 1 is a block diagram of an apparatus 100 for removing an image blocking artifact by using a transformation coefficient, according to an exemplary embodiment.

The apparatus 100 includes a flat region blocking artifact detector 110, a flat region blocking artifact remover 120, an edge region detector 130, and an edge region blocking artifact remover 140.

The apparatus 100 is an image processing processor, and may be interlocked with a calculation processor such as a graphic processing unit (GPU), or controlled by a calculation processor. Also, the apparatus 100 may be installed in a decoder or as an external device of a decoder. More generally, parts of the apparatus 100 may be realized by hardware components, such as by processor(s) or circuit(s), and/or by software components executed by hardware components.

The flat region blocking artifact detector 110 detects a blocking artifact in a flat region of an input image of the apparatus 100. The input image of the apparatus 100 may be an image obtained by decoding an encoded image using a decoder and then restoring the decoded image in a spatial region.

If the blocking artifact is detected in the flat region based on the result of the detecting by the flat region blocking artifact detector 110, the flat region blocking artifact remover 120 removes the blocking artifact in the flat region by using a predetermined number of low frequency coefficients from among transformation coefficients, for blocks of the input image.

The edge region detector 130 detects an edge region of the input image in comparison with the flat region detected by the flat region blocking artifact detector 110.

The edge region blocking artifact remover 140 removes a blocking artifact in the edge region detected by the edge region detector 130.

In detail, the flat region blocking artifact detector 110 according to an exemplary embodiment may determine flat blocks in the input image, and detect a blocking artifact in the flat region based on blocking artifact intensities of the flat blocks. According to an exemplary embodiment, a blocking artifact strength (BAS) of a current flat block may be determined based on a difference between direct current (DC) coefficients of the current flat block and adjacent blocks.

The flat region blocking artifact remover 120 according to an exemplary embodiment may determine transformation coefficients for pixels of the input image by performing a transformation on pixels in a block unit including a current pixel and having a predetermined size, for each pixel of the input image. Examples of a block transformation according to an exemplary embodiment may include a discrete cosine transformation (DCT), an orthogonal transformation, an integer transformation, etc. The flat region blocking artifact remover 120 according to an exemplary embodiment may remove a blocking artifact in a flat block being processed by compensating for a predetermined number of low frequency coefficients from among transformation coefficients, for each pixel of the pixels of the input image.

Figure 5:
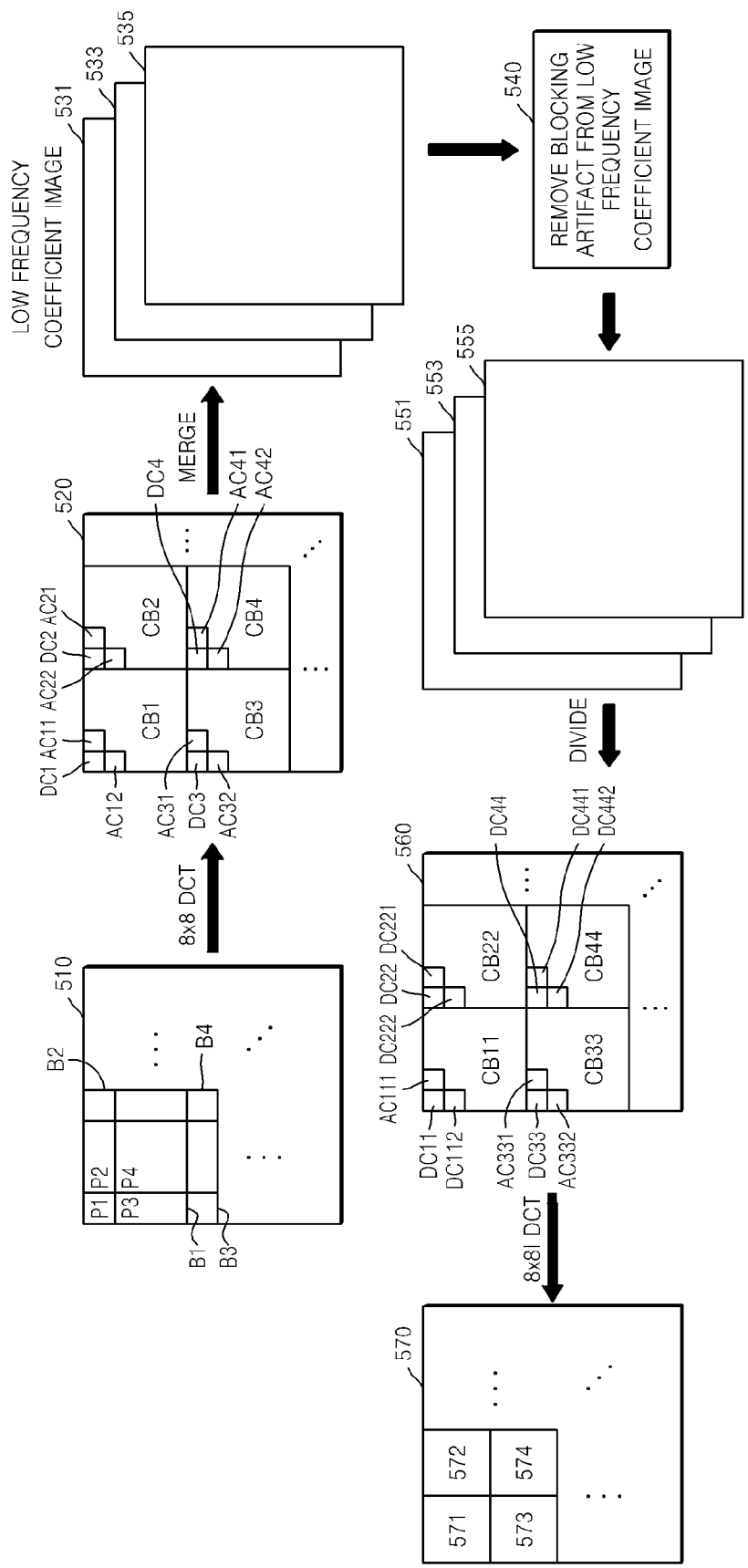
FIG. 5 is a diagram for describing a method of removing a blocking artifact in a flat region, according to an exemplary embodiment.

Each of the unit blocks of pixels of the input image includes a current pixel and corresponding pixels in a current block having a predetermined size. Thus blocks of pixels of the input image overlap if they are blocks of adjacent pixels, such as shown in the example of FIG. 5. However, transformation blocks do not overlap since they are obtained by dividing the input image into data blocks of a predetermined size for performing a block transformation of the entire input image.

The flat region blocking artifact remover 120 according to an exemplary embodiment may (a) determine a smoothing filtering strength of the blocking artifact of the flat blocks based on the blocking artifact intensities of the flat blocks, and (b) remove the blocking artifact in the flat block by performing smoothing filtering on a block boundary of the flat blocks based on the determined smoothing filtering strength.

The flat region blocking artifact remover 120 according to an exemplary embodiment may determine a filtering strength of a total variation filtering for removing the blocking artifact in the flat region, based on local blocking artifact intensities of the flat block. Accordingly, the flat region blocking artifact remover 120 may remove the blocking artifact of the flat block by performing a total variation filtering based on intrinsic smoothing filtering strength determined for each flat block. Accordingly, an output image of the flat region blocking artifact remover 120 may be an intermediate image obtained by removing the blocking artifact in the flat region of the input image.

The edge region detector 130 according to an exemplary embodiment may generate a low frequency band image by inverse transforming an image that includes a predetermined number of low frequency coefficients from among the transformation coefficients, wherein other coefficients are 0, for the transformation blocks of the input image. The edge region detector 130 according to an exemplary embodiment may also generate a high frequency band image by subtracting the low frequency band image from the input image.

The edge region detector 130 according to an exemplary embodiment may determine a transformation block of which the energy of the samples is higher than a predetermined threshold value from among transformation blocks of the high frequency band image as an edge block. The energy of the samples may be an average of absolute values of the transformation coefficients of the transformation blocks or an average of absolute values of the pixel brightness of pixels of the transformation blocks.

The edge region blocking artifact remover 140 according to an exemplary embodiment receives the intermediate image from which the blocking artifact in the flat region is removed by the flat region blocking artifact remover 120. The edge region blocking artifact remover 140 may determine an edge region of the intermediate image, which corresponds to the edge region detected by the edge region detector 130. For example, the edge region blocking artifact remover 140 may determine edge blocks in the same location as edge blocks determined by the edge region detector 130, from among transformation blocks of the intermediate image.

The edge region blocking artifact remover 140 according to an exemplary embodiment may group edge blocks forming the same edge from among the edge blocks of the intermediate image, and perform a three-dimensional (3D) orthogonal transformation on edge blocks in a group for each of the groups. The edge region blocking artifact remover 140 according to an exemplary embodiment may remove blocking artifact in the edge blocks by using a 3D orthogonal transformation coefficients of the edge blocks in a group, according to the groups.

The edge region blocking artifact remover 140 according to an exemplary embodiment may perform threshold filtering on the 3D transformation coefficients of the edge blocks in a group. The edge region blocking artifact remover 140 according to an exemplary embodiment may restore the edge blocks in a group according to groups by performing inverse 3D orthogonal transformation on the 3D transformation coefficients on which the threshold filtering is performed.

The edge region blocking artifact remover 140 according to an exemplary embodiment may update the detected edge region of the input image based on the restored edge blocks. In other words, the edge region blocking artifact remover 140 may update the edge blocks of the intermediate image from which the blocking artifact in the flat region is removed such that the blocking artifact of the edge blocks is additionally removed.

Accordingly, the apparatus 100 first detects and removes the blocking artifact in the flat region and then removes the blocking artifact in the edge region, thereby naturally removing the image blocking artifact generated through block transformation of an image. Also, the apparatus 100 may remove the image blocking artifact by only using image information of the input image.

If the input image is an encoded image restored via decoding, the apparatus 100 may remove the image blocking artifact by only using the restored image, i.e., without having to use encoding information determined during an encoding process. Specifically, since most video data uploaded to a website is already compressed, the video data may have low quality compared to the original data, and it may be difficult to obtain encoding information. The apparatus 100 is able to estimate the BAS by using a deblocking technique without using various types of encoding information (such as the size of a transformation block in a frame, a quantization parameter (QP) and a quantization table), and to reduce a blocking artifact, without damaging the quality of an image, based on estimated filtering strength.

Figure 2:
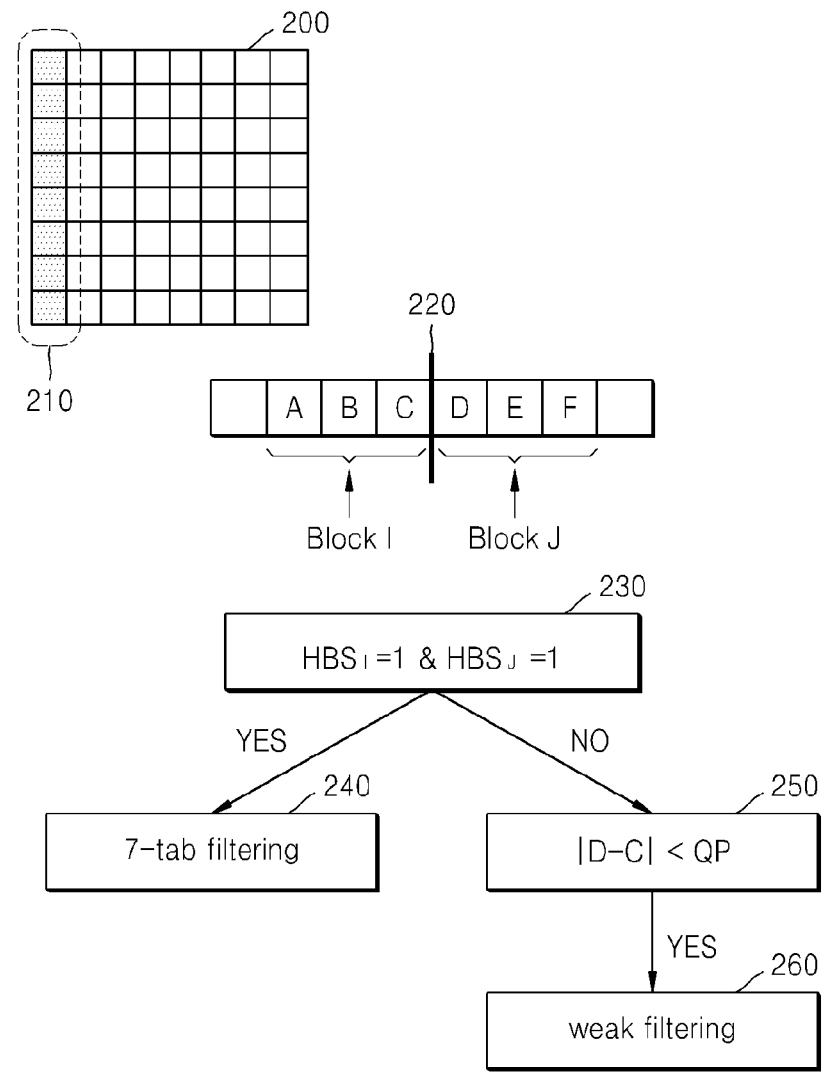
FIG. 2 is a flow diagram for describing a related art method of removing a blocking artifact.

FIG. 2 is a flow diagram for describing a related art method of removing a blocking artifact.

According to a related art post-processing filtering technique for reducing a blocking artifact, one-dimensional (1D) filtering is performed on a block boundary between adjacent blocks based on BAS.

For example, horizontal block boundary strength (HBS) may be used as the BAS of a transformation block 200 having a size of 8×8.

The HBS of the transformation block 200 may be set to 1 if only coefficients 210 at the first left column from among DCT coefficients are not 0 The HBS of the transformation block 200 may be set to 0 if there is a coefficient that is not 0 from among coefficients excluding the coefficients 210.

When blocks A through F are consecutively arranged in a horizontal direction, the HBS may be determined with respect to a block boundary 220 between a block group J including the blocks A through C and a block group I including the blocks D through F.

For example, a method of determining the BAS includes operations 230 through 260. In operation 230, $HBS_I$ of the block group I and $HBS_J$ of the block group J are determined.

If the $HBS_I$ and the HBS are both 1 (i.e., $HSB_I=1$ & $HSB_J=1$), it may be determined that the block boundary 220 is strong, and thus 7-tab filtering is performed on the block boundary 220 in operation 240. In other words, 6 pixel values arranged in the horizontal direction may be compensated for based on the block boundary 220.

Alternatively, if at least one of the group consisting of the $HSB_I$ and the $HSB_C$ is not 1 (i.e., !($HSB_I=1$ & $HSB_J=1$)), a difference (|D−C|) between pixel values at the block boundary 220 of the adjacent blocks D and C and a QP are compared in operation 250. If the difference is less than the QP, it is determined that the block boundary 220 is weak, and thus a smoothing filtering which is weaker than 7-tab filtering is performed on the block boundary 220 in operation 260. For example, 4 pixel values are compensated for.

Since filtering strength is determined by the QP in the related art post-processing filtering technique described with reference to FIG. 2, encoding information is required. Also, since filtering is performed on pixels of a line perpendicular to the block boundary 220 and smoothing filtering is performed by changing the filtering strength line-by-line, continuity between pixels in a horizontal direction of the block boundary 200 may be damaged.

Also, since the related art post-processing filtering technique only processes a signal in a straight line by using 1D filtering, smoothing filtering cannot be performed by considering a two-dimensional (2D) structure of the signal. For example, if an edge exists at a block boundary, the edge may appear unnaturally cut due to the performing of the block transformation. A 1D filtering operation flattens the block boundary without preserving the cut edge.

Further, the related art post-processing filtering technique uses a QP to determine filtering strength, but in an actual moving image compressing technique, different quantization tables are used according to the image frames, and the QP may vary according to the blocks in a frame. Thus, it is not efficient to actually use a quantization table during a post-processing operation.

Figure 3A:
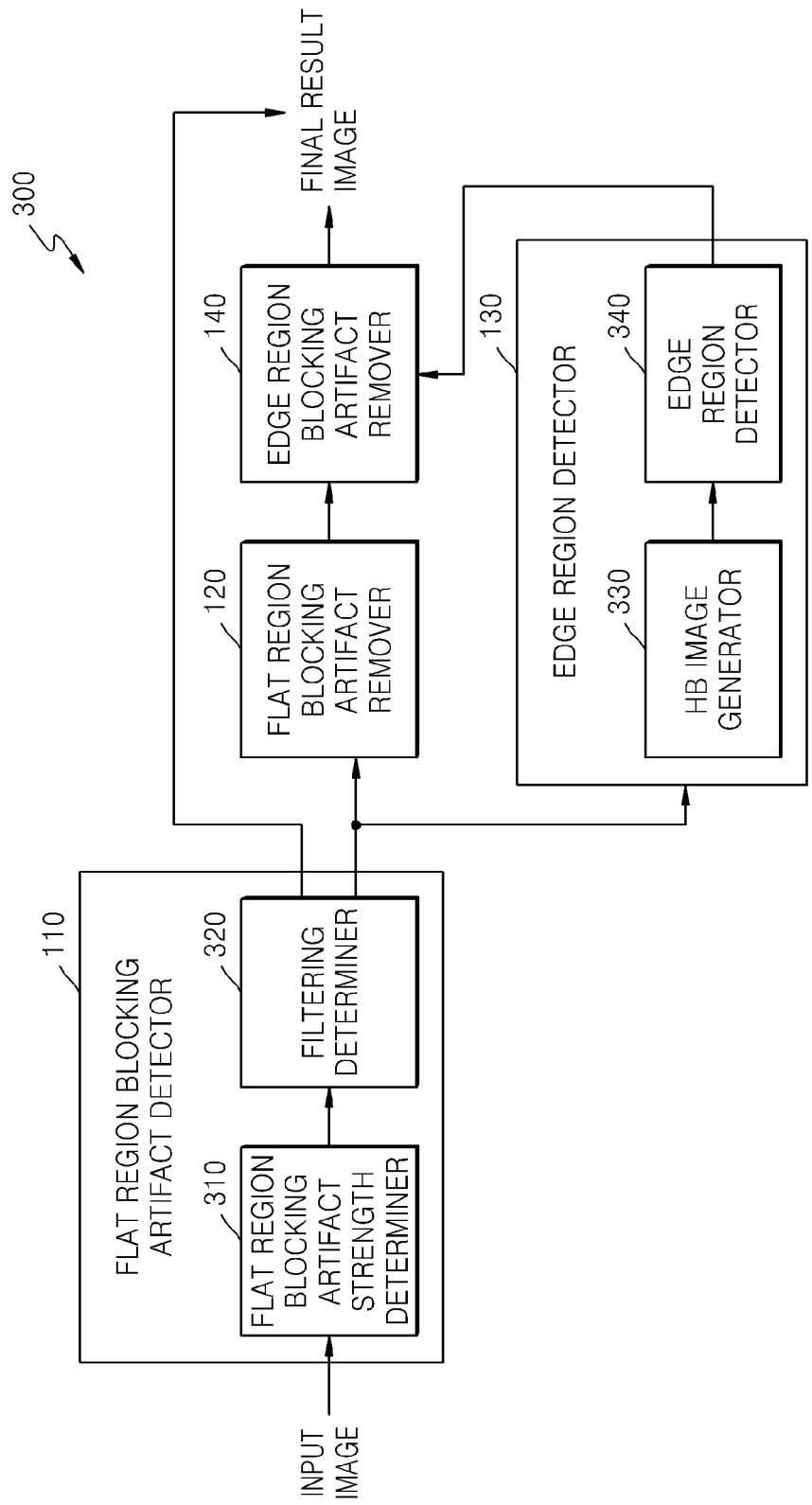
FIG. 3A is a block diagram of an apparatus for removing an image blocking artifact, according to another exemplary embodiment.

FIG. 3A is a block diagram of an apparatus 300 for removing an image blocking artifact, according to another exemplary embodiment.

The apparatus 300 according to the current exemplary embodiment includes a flat region blocking artifact detector 110, a flat region blocking artifact remover 120, an edge region detector 130, and an edge region blocking artifact remover 140, and has the same basic structure as the apparatus 100 of FIG. 1. However, the flat region blocking artifact detector 110 according to the current exemplary embodiment may include a flat region BAS determiner 310 and a filtering determiner 320. Also, the edge region detector 130 according to the current exemplary embodiment may include a high band (HB) image generator 330 and an edge region detector 340.

In detail, the flat region blocking artifact detector 110 may determine flat blocks in an input image, determine the BAS in the flat blocks, and detect a blocking artifact in a flat region based on the BAS in the flat blocks.

The flat region BAS determiner 310 may determine the BAS of a current flat block based on a difference between DC coefficients of adjacent blocks of the current flat block. The flat region BAS determiner 310 may determine individual BASes of the flat blocks, i.e., local BASes of the flat blocks.

The flat region BAS determiner 310 may determine a global BAS of the input image based on an average of the local BASes of the flat blocks.

A method of determining a global BAS performed by the flat region BAS determiner 310 is described below with reference to FIG. 4.

The filtering determiner 320 may determine whether a blocking artifact is generated in the flat region of the input image by comparing the global BAS determined by the flat region BAS determiner 310 and a predetermined threshold value. Along with the result of determining whether the blocking artifact is generated in the flat region of the input image, the filtering determiner 320 may determine whether deblocking filtering is required to remove the blocking artifact of the input image.

In other words, if it is determined that the global BAS exceeds a predetermined threshold value, the filtering determiner 320 may determine that the blocking artifact is generated in the flat region of the input image, and determine to perform deblocking filtering for removing the blocking artifact in the flat region of the input image.

However, if it is determined that the global BAS does not exceed the predetermined threshold value, the filtering determiner 320 may output the input image as a final result image without performing deblocking filtering on the input image.

The flat region blocking artifact remover 120 may determine transformation coefficients for the input image pixels by performing, for each pixel, a transformation on pixels in a block unit, including a current pixel and having a predetermined size, and remove a blocking artifact in the flat block by compensating for a predetermined number of low frequency coefficients from among the transformation coefficients according to the input image pixels, for each pixel.

The flat region blocking artifact remover 120 may replace transformation coefficients in the same location as the predetermined number of compensated for low frequency coefficients, from among the transformation coefficients of the transformation blocks of the input image, with the compensated for low frequency coefficients. The flat region blocking artifact remover 120 may extract low frequency coefficients in blocks in the same location as the transformation blocks of the input image, from among the compensated for low frequency coefficients. The flat region blocking artifact remover 120 may replace low frequency coefficients in the same location as the extracted low frequency coefficients, from among the low frequency coefficients of the transformation blocks of the input image, with the extracted low frequency coefficients.

The flat region blocking artifact remover 120 may generate an intermediate image in a spatial region by inverse transforming the transformation coefficients of the input image, wherein some transformation coefficients are replaced with the compensated for low frequency coefficients, according to transformation blocks. The generated intermediate image may be an image obtained by removing the blocking artifact in the flat region from the input image.

The flat region blocking artifact remover 120 may separately compensate for the predetermined number of low frequency coefficients according to coefficient locations. For example, the flat region blocking artifact remover 120 may classify the predetermined number of low frequency coefficients according to coefficient locations in the transformation blocks, and generate low frequency coefficient images in which low frequency coefficients in the same coefficient locations are arranged in an order of a corresponding block, for the coefficient locations of the low frequency coefficients.

The flat region blocking artifact remover 120 may remove the blocking artifact in the flat region by using the generated low frequency coefficient images.

For example, the flat region blocking artifact remover 120 may determine smoothing filtering strength of the blocking artifact in the flat block based on a BAS of the flat block for each low frequency coefficient image, and remove the blocking artifact in the flat block based on the determined smoothing filtering strength. Alternatively, the flat region blocking artifact remover 120 may determine filtering strength of total variation filtering for each flat block based on the local BASes of the flat blocks for each low frequency coefficient image.

Accordingly, the flat region blocking artifact remover 120 may compensate for the low frequency coefficients by performing total variation filtering based on intrinsic smoothing filtering strength determined according to flat regions, for each low frequency coefficient image.

The flat region blocking artifact remover 120 may replace transformation coefficients in the same location as the low frequency coefficients compensated for by using the low frequency coefficient images, from among the transformation coefficients of the transformation blocks of the input image, with the compensated for low frequency coefficients. The flat region blocking artifact remover 120 may extract the low frequency coefficients in the locations corresponding to the transformation blocks of the input image, from among the compensated for low frequency coefficients according to the low frequency coefficient images.

In other words, when the low frequency coefficient images are generated, low frequency coefficients in a predetermined coefficient location are extracted for blocks according to the pixels of the input image and are arranged according to an order of the pixels of the input image. Accordingly, the size of the low frequency coefficient images is identical to the size of the input image, and by performing filtering for removing the blocking artifacts in the flat blocks of the low frequency coefficient images, the transformation coefficients of the compensated for low frequency coefficient images correspond to all pixels of the input image in a one-to-one manner.

Accordingly, the flat region blocking artifact remover 120 may extract transformation coefficients in locations corresponding to the transformation blocks of the input image, from among the transformation coefficients of the compensated for low frequency coefficient images, and replace the transformation coefficients in the predetermined coefficient location in the transformation blocks of the input image with the transformation coefficients extracted from the compensated for low frequency coefficient images. The flat region blocking artifact remover 120 may replace the transformation coefficients in the coefficient locations in the transformation blocks of the input image with the transformation coefficients extracted from the compensated for low frequency coefficient images, in correspondence to coefficient locations of low frequency coefficients forming each low frequency coefficient image, which occupy the blocks according to pixels of the input image.

The removing of the blocking artifact in the flat region by using the low frequency coefficient images generated according to coefficient locations of the low frequency coefficients is described in detail below with reference to FIGS. 5 and 6.

The HB image generator 330 of the edge region detector 130 may generate a low frequency band image by inverse transforming an image formed of transformation blocks including a predetermined number of low frequency coefficients from among transformation coefficients according to the transformation blocks of the input image, wherein other coefficients are 0. The HB image generator 330 may generate a high frequency band image by subtracting the low frequency band image including only the predetermined number of low frequency coefficients from the transformation blocks of the input image.

The HB image generator 330 may generate a high frequency band image by subtracting the flat regions detected by the flat region blocking artifact detector 110 from the transformation blocks of the input image.

The edge region detector 340 of the edge region detector 130 may determine a transformation block of which the energy of samples is higher than a predetermined threshold value, from among transformation blocks of the high frequency band image, as an edge block. The energy of samples may be an average of absolute values of the transformation coefficients of the transformation blocks or an average of absolute values of pixels of the transformation blocks.

The edge region blocking artifact remover 140 receives the intermediate image from which the blocking artifact in the flat region is removed by the flat region blocking artifact remover 120. The edge region blocking artifact remover 140 may determine an edge region of the intermediate image in correspondence to the edge region detected by the edge region detector 130. For example, the edge region blocking artifact remover 140 may determine edge blocks in the same location as the edge blocks determined by the edge region detector 130, from among the transformation blocks of the intermediate image.

The edge region blocking artifact remover 140 may group edge blocks forming the same edge from among the edge blocks of the intermediate image, and perform a 3D orthogonal transformation with respect to edge blocks in a group, for each of the groups. The edge region blocking artifact remover 140 may remove a blocking artifact in the edge blocks by using 3D transformation coefficients of the edge blocks in a group, for each of the groups.

The edge region blocking artifact remover 140 may perform 3D orthogonal transformation on blocks grouped via block matching, and remove a blocking artifact in a group of edge blocks forming the same edge by using a block-matching and 3D filtering (BM3D) technique for performing filtering on 3D transformation coefficients.

The edge region blocking artifact remover 140 may perform a threshold filtering on the 3D transformation coefficients of edge blocks in a group. For example, the edge region blocking artifact remover 140 may perform threshold filtering of transformation coefficients to "0" on the edge blocks in a predetermined group if the 3D transformation coefficients are less than a predetermined threshold value.

The edge region blocking artifact remover 140 may restore the edge blocks in a group according to the groups by performing inverse 3D orthogonal transformation on the 3D transformation coefficients on which the threshold filtering is performed.

The edge region blocking artifact remover 140 may restore a plurality of edge blocks by performing a 3D orthogonal transformation, a threshold filtering, and an inverse 3D orthogonal transformation according to the groups, and update the edge region by determining a weighted average block with respect to overlapping edge blocks of the restored edge blocks, for the groups.

The edge region blocking artifact remover 140 may update the edge region in the intermediate image based on the restored edge blocks. Since the edge region blocking artifact remover 140 updates the edge region from which a blocking artifact in the edge blocks are additionally removed, from the intermediate image from which the blocking artifact in the flat region is removed, an image from which a blocking artifact generated due to block transformation may finally be output.

The method of removing the blocking artifact in the edge region via 3D transformation on the groups of edge blocks will be described below in detail with reference to FIG. 7.

FIGS. 3B and 3C are block diagrams of apparatuses 350 and 370, respectively, for removing an image blocking artifact, according to other exemplary embodiments.

The apparatuses 350 and 370 according to the current exemplary embodiments include a flat region blocking artifact detector 110, a flat region blocking artifact remover 120, an edge region detector 130, and an edge region blocking artifact remover 140, and basically has the same structure as the apparatus 100 of FIG. 1.

Similar to operations of the apparatus 100, the flat region blocking artifact detector 110 detects a blocking artifact in a flat region of an input image; the flat region blocking artifact remover 120 removes the blocking artifact in the flat region by using a predetermined number of low frequency coefficients from among transformation coefficients, for blocks of the input image; the edge region detector 130 detects an edge region of the input image; and the edge region blocking artifact remover 140 removes a blocking artifact in the edge region.

In case of the apparatus 350, the edge region detector 130 may detect edge regions of the input image, prior to operations for detecting blocking artifacts via the flat region blocking artifact detector 110. Thus, the flat region blocking artifact detector 110 may receive results of the detecting of the edge regions from the edge region detector 130, and detect blocking artifacts in flat regions of an image which may be not the detected edge regions.

In case of the apparatuses 370, the flat region blocking artifact detector 110 and the edge region detector 130 may respectively detect flat regions and edge regions of the input image.

FIGS. 3A, 3B and 3C, illustrate examples where the blocking artifacts of the edge regions and flat regions may be separately removed. The flat region blocking artifact remover 120 may remove block artifacts of the flat regions detected by the flat region blocking artifact detector 110, and then the edge region blocking artifact remover 140 may further remove blocking artifacts of edge regions from an image in which block artifacts of flat regions are removed.

Figure 4:
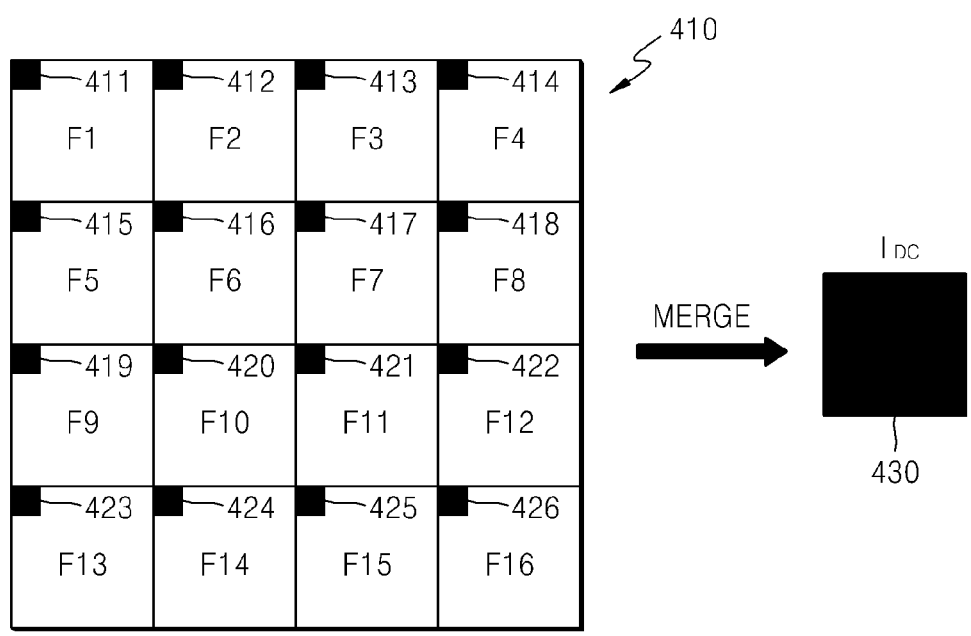
FIG. 4 is a diagram for describing a method of detecting a blocking artifact in a flat region, according to an exemplary embodiment.

FIG. 4 is a diagram for describing a method of detecting a blocking artifact in a flat region 410, according to an exemplary embodiment. Detecting of a blocking artifact in a flat region performed by the flat region blocking artifact detector 110 is described with reference to FIG. 4.

The apparatuses 100 and 300 according to the exemplary embodiments may remove a blocking artifact in a flat region by using low frequency coefficients from among transformation coefficients of a transformation block. Specifically, a blocking artifact where quantization of DC coefficients from among the low frequency coefficients is severe may be generated. Accordingly, the flat region blocking artifact detector 110 may determine the BAS by using a difference between DC coefficients of adjacent blocks, i.e., a gradient of DC coefficients of adjacent blocks.

DC coefficients 411 through 426 are extracted from transformation coefficients of flat blocks F1 through F16 of a transformation region in the flat region 410 of the input image, and are merged to form an image $I_{DC}$ 430.

The flat region blocking artifact detector 110 may determine a local BAS for locations of flat blocks by using a gradient of the image 430. The flat region blocking artifact detector 110 may determine a global BAS by calculating an average of the local BASes of all flat blocks of the flat region 410. In order to determine the global BAS (BASg), an average of absolute values of gradients in horizontal and vertical directions of the image $I_{DC}$ 430, including only the DC coefficients of all flat blocks, may be calculated.

According to Equation 1 (given below), a local BAS of each flat block with respect to N flat blocks F of the flat region 410 of the input image may be a sum of an absolute value $|\nabla_x I_{DC}|$ of a gradient in an x-axis direction and an absolute value $|\nabla_y I_{DC}|$ of a gradient in an y-axis direction for each transformation coefficient of the image $I_{DC}$ 430. Accordingly, the BASg of the flat region 410 is represented by Equation 1, i.e., an average of local BASes of the transformation coefficients of the image $I_{DC}$ 430.

$$BAS_g = \frac{1}{N}\sum_F (|\nabla_x I_{DC}| + |\nabla_y I_{DC}|) \qquad \text{Equation (1)}$$

When the BASg of the flat region 410 is higher than a predetermined threshold value, the flat region blocking artifact detector 110 may detect that a blocking artifact is generated in the flat region 410 and determine that deblocking filtering needs to be performed on the flat region 410.

FIG. 5 is a diagram for describing a method of removing a blocking artifact in a flat region, according to an exemplary embodiment. An operation of the flat region blocking artifact remover 120 is now described with reference to FIG. 5.

The flat region blocking artifact remover 120 may perform a transformation on pixels p1 through p4 of an input image 510 in block units. For example, the flat region blocking artifact remover 120 may perform an 8×8 DCT on each of the blocks B1 through B4 having a size of 8×8, wherein the pixels p1 through p4 are located at an upper left corner.

A DCT block group 520 includes DCT blocks CB1 through CB4 of the blocks B1 through B4, respectively. The DCT blocks are arranged according to pixels of the input image 510. The flat region blocking artifact remover 120 extracts three low frequency coefficients: a DC coefficient, a first alternating current (AC) coefficient, and a second AC coefficient, from among transformation coefficients of the DCT blocks. For example, the flat region blocking artifact remover 120 may extract coefficients DC1, AC11, and AC12 from transformation coefficients of the DCT block CB1, and similarly, extract coefficients DC2, AC21, and AC22 of the DCT block CB2, coefficients DC3, AC31, and AC32 of the DCT block CB3, and coefficients DC4, AC41, and AC42 of the DCT block CB4.

The flat region blocking artifact remover 120 may classify the three low frequency coefficients, i.e., the DC coefficient, the first AC coefficient, and the second AC coefficient, according to the coefficient location. The flat region blocking artifact remover 120 may form a low frequency coefficient image 531 in which the DC coefficients DC1 through DC4 are arranged in an order of corresponding DCT blocks CB1 through CB4. Similarly, a low frequency coefficient image 533, in which the first AC coefficients AC11 through AC41 are arranged in an order of DCT blocks, and a low frequency coefficient image 535, in which the second AC coefficients AC12 through AC42 are arranged in an order of DCT blocks, may also be generated.

Since the low frequency coefficient images 531 through 535 are images including the low frequency coefficients of the input image 510, pixels of the low frequency coefficient images 531 through 535 correspond to the low frequency coefficients of the input image 510.

In operation 540, the flat region blocking artifact remover 120 may remove the blocking artifact in the flat block by using the low frequency coefficient images 531 through 535. The flat region blocking artifact remover 120 may determine a smoothing filtering strength for removing the blocking artifact in each flat block based on the local BAS of the flat block. Low frequency coefficients of the low frequency coefficient images 531 through 535 may be compensated for by performing deblocking filtering based on an intrinsic smoothing filtering strength determined according to the flat blocks with respect to the pixels i.e., the low frequency coefficients corresponding to the flat blocks.

The flat region blocking artifact remover 120 may perform strong smoothing filtering where the local BAS of a flat block is high, and may perform weak smoothing filtering where the local BAS of a flat block is low.

Figure 6:
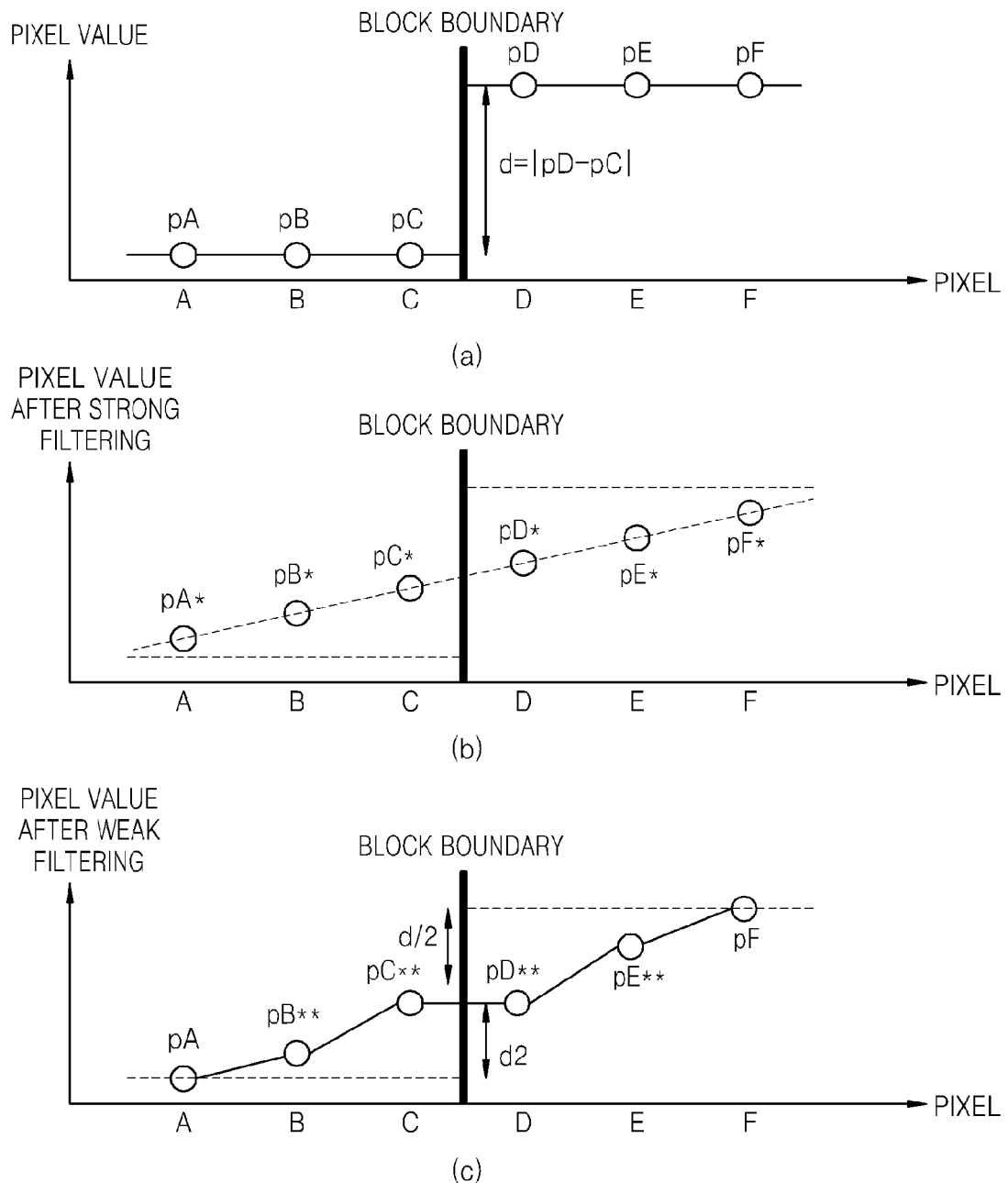
FIG. 6 illustrates graphs for describing filtering for removing a blocking artifact in a flat region, according to an exemplary embodiment.

FIG. 6 illustrates graphs for describing filtering for removing a blocking artifact in a flat region, according to an exemplary embodiment.

As shown in FIG. 6 (*a*), brightnesses pA, pB, and pC of pixels A, B, and C are similar to each other and brightnesses pD, pE, and pF of pixels D, E, and F are similar to each other from among consecutive pixels (i.e., low frequency coefficients) A through F in the low frequency coefficient images 531 through 535 shown in FIG. 5. There is a brightness difference |pD−pC| between the pixel D and the pixel C with respect to a brightness difference d between the pixels A through C and the pixels D through F, and a block boundary is formed between the pixels A through C and the pixels D through F.

The flat region blocking artifact remover 120 may induce a filtering result such as shown in FIG. 6 (*b*) when strong smoothing filtering is performed on the block boundary between the pixels A through C and the pixels D through F. For example, the flat region blocking artifact remover 120 may perform filtering on the six consecutive pixels A through F based on the block boundary, from among the low frequency coefficient images 531 through 535 shown in FIG. 5. Discontinuous brightnesses pA through pF of the pixels A through F are respectively compensated for resulting in brightnesses pA* through pF*, and thus the brightnesses of the pixels A through F may be evened so as to be continuously and linearly increasing or decreasing.

When weak smoothing filtering is performed on the block boundary between the pixels A through C and the pixels D through F, the flat region blocking artifact remover 120 may compensate for the brightnesses of some pixels around the block boundary, such as shown in FIG. 6 (*c*). For example, the flat region blocking artifact remover 120 may perform filtering on four consecutive pixels B through E based on the block boundary, from among the low frequency coefficient images 531 through 535 shown in FIG. 5. Discontinuous brightness pB through pE of the pixels B through E are compensated for so as to result in brightnesses pB through pE, and thus the brightnesses of the pixels A through F may be evened so as to continuously increase or decrease.

Here, a degree of compensation may be variably determined according to a distance between pixels to be compensated for and a block boundary. For example, the brightnesses pB and pE obtained by respectively compensating for the brightnesses pB and pE of the pixels B and E, that are relatively far from the block boundary, have a relatively low degree of compensation as a rate of increase from the brightness pB and pE is ⅛. The brightnesses pC and pD obtained by respectively compensating for the brightnesses pC and pD of the pixels C and D, that are relatively close to the block boundary, have a relatively high degree of compensation as a rate of increase from the brightnesses pC and pD is ½.

Accordingly, the flat region blocking artifact remover 120 may perform strong smoothing filtering (FIG. 6 (*b*)) where the local BAS of a flat block is high, and weak smoothing filtering (FIG. 6 (*c*)) where the local BAS of a flat block is low.

Referring again to FIG. 5, the flat region blocking artifact remover 120 may generate low frequency coefficient images 551 through 555 by compensating for low frequency coefficients of the low frequency coefficient images 531 through 535. The flat region blocking artifact remover 120 may select and extract low frequency coefficients in a location corresponding to the transformation blocks of the input image 510 from among low frequency coefficients of the low frequency coefficient images 551 through 555.

Accordingly, the flat region blocking artifact remover 120 may extract one pixel per eight (i.e., ⅛) consecutive pixels in a location corresponding to a transformation block having a size of 8×8 of the input image 510, from among the low frequency coefficients of the low frequency coefficient images 551 through 555, and replace a low frequency coefficient of the transformation block of the input image 510 with the extracted pixel.

In other words, pixels extracted from the low frequency coefficient image 551 may replace DC coefficients in the transformation blocks of the input image 510, pixels extracted from the low frequency coefficient image 533 may replace the first AC coefficients in the transformation blocks of the input image 510, and pixels extracted from the low frequency coefficient image 555 may replace the second AC coefficients in the transformation blocks of the input image 510.

For example, the flat region blocking artifact remover 120 may extract compensation coefficients DC11 through DC44, one pixel per eight pixels, from the low frequency coefficient image 551. The flat region blocking artifact remover 120 may extract compensation coefficients AC111 through AC441, one per eight pixels, from the low frequency coefficient image 553, and extract compensation coefficients AC 112 through AC 442, one per eight pixels, from the low frequency coefficient image 555.

Accordingly, DC coefficients of transformation blocks CB11 through CB44 of an intermediate image 560 in a transformation region may be respectively replaced with the compensation coefficients DC11 through DC44 extracted from the low frequency coefficient image 551. Similarly, the first AC coefficients of the transformation blocks CB11 through CB44 of the intermediate image 560 may be respectively replaced with the compensation coefficients AC111 through AC441 extracted from the low frequency coefficient image 553, and second AC coefficients of the transformation blocks CB11 through CB44 may be respectively replaced with the compensation coefficients AC112 through AC442 extracted from the low frequency coefficient image 555.

As a result, the DC coefficients, the first AC coefficients, and the second AC coefficients of the transformation blocks CB11 through CB44 of the intermediate image 560 are replaced with the compensation coefficients of the low frequency coefficient images 551 through 555, but the other 61 coefficients (i.e., the 61 coefficients remaining out of the total of 64 coefficients) are maintained as coefficients of DCT blocks of the input image 510.

The flat region blocking artifact remover 120 may generate an intermediate image 570 in a spatial region by performing an inverse DCT on the intermediate image 560 in the transformation region in block units having a size of 8×8. The intermediate image 570 in a spatial region is a resultant image obtained by removing a blocking artifact in a flat block from the input image 510.

Figure 7:
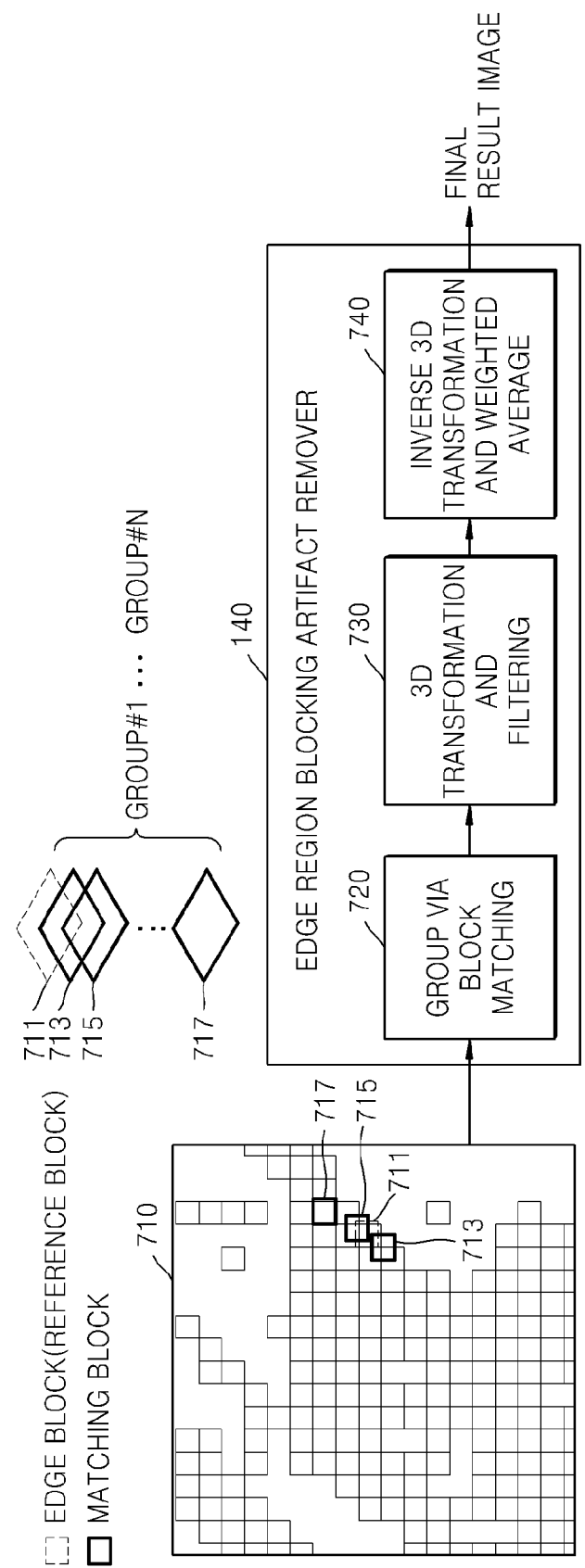
FIG. 7 is a diagram for describing a method of removing a blocking artifact in an edge region, according to an exemplary embodiment.

FIG. 7 is a diagram for describing a method of removing a blocking artifact in an edge region, according to an exemplary embodiment. A method of removing a blocking artifact generated in an edge region of an input image, which is performed by the edge region blocking artifact remover 140, is described with reference to FIG. 7.

The edge region detector 130 may generate a high frequency band image by subtracting a low frequency band image including only a predetermined number of low frequency coefficients from transformation blocks of an input image. The edge region detector 130 may determine a transformation block of which the energy of samples is higher than a predetermined threshold value, from among transformation blocks of the high frequency band image, as an edge block.

As shown in FIG. 7, the edge region blocking artifact remover 140 may receive an intermediate image 710 from which a blocking artifact in a flat region is removed by the flat region blocking artifact remover 120, and obtain locations of edge blocks from the edge region detector 130. The edge region blocking artifact remover 140 may determine edge blocks of the intermediate image 710 in correspondence to edge blocks detected by the edge region detector 130. In the intermediate image 710, blocks having solid line borders are edge blocks.

The edge region blocking artifact remover 140 may group edge blocks that form the same edge, from among the edge blocks of the intermediate image 710, in unit 720. For example, the edge region detector 130 may determine edge blocks 713 through 717 as forming the same edge by searching for matching blocks 713 through 717 having bold solid line borders from among adjacent blocks in a predetermined range based on an edge block (i.e., a reference block) 711 having a dashed-line border via block matching for searching for a similar block.

Since the edge region blocking artifact remover 140 groups edge blocks by performing block matching on pre-detected edge blocks, throughput of a 3D transformation technique based on block matching may be reduced.

The edge region blocking artifact remover 140 may determine at least one group of edge blocks forming the same edge. In other words, not only a GROUP #1 of the edge blocks 711 through 717 grouped via block matching is not formed, but also various groups of edge blocks may be formed by searching for edge blocks forming other edges.

For convenience of description, an operation of the edge region blocking artifact remover 140 is described as an operation for the GROUP #1, but the operation may be performed for groups 1 through N, and results may be combined.

The edge region blocking artifact remover 140 may calculate 3D transformation coefficients of edge blocks in a group by performing 3D orthogonal transformation on the edge blocks 711 through 717 in the GROUP #1, and remove a blocking artifact in the edge blocks in a group by performing threshold filtering on the 3D transformation coefficients, in unit 730.

According to a statistical distribution of 3D transformation coefficients of an image, a possibility of a blocking artifact generation is low in a block in which distribution of 3D transformation coefficients that are not "0" from among 3D transformation coefficients, is not dense. Accordingly, the edge region blocking artifact remover 140 may reduce the number of 3D transformation coefficients that are not "0" by transforming a 3D transformation coefficient in an edge block less than a predetermined threshold value to "0" via threshold filtering according to a hard-thresholding technique for changing a 3D transformation coefficient to "0" if the 3D transformation coefficient is less than a predetermined threshold value. In other words, the edge region blocking artifact remover 140 may output edge blocks of which the distribution of the 3D transformation coefficients that are not "0" is not dense. Accordingly, a structure of edge blocks in a group is preserved while transformation coefficients are compensated for, thereby removing a blocking artifact in an edge block.

In unit 740, the edge region blocking artifact remover 140 may restore the edge blocks 711 through 717 of GROUP #1 by performing an inverse 3D orthogonal transformation on 3D transformation coefficients on which threshold filtering is performed. Also, in unit 740 the edge region blocking artifact remover 140 may restore edge blocks by performing a 3D orthogonal transformation, a threshold filtering, and an inverse 3D orthogonal transformation for groups including GROUP #1 (and up to GROUP #N), and determine a weighted average block with respect to overlapping edge blocks from among the restored edge blocks according to groups, thereby updating an edge region of the intermediate image 710. As shown, in FIG. 7, the resulting final image may then be output. A blocking artifact that remains may be removed again per an edge block via the weighted average of the edge blocks according to groups.

Figure 8:
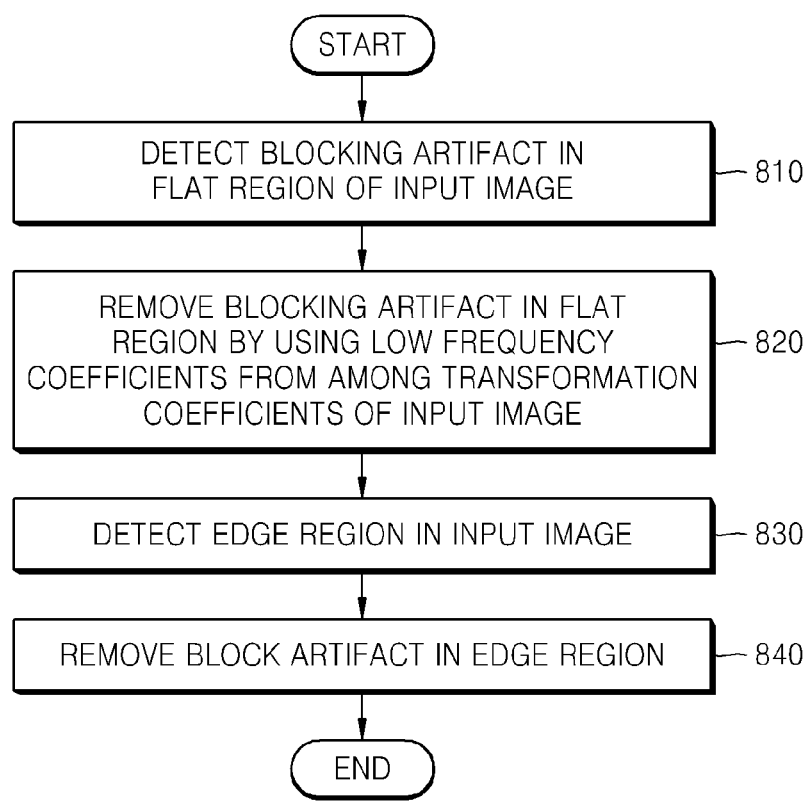
FIG. 8 is a flowchart illustrating a method of removing an image blocking artifact by using a transformation coefficient, according to an exemplary, embodiment.

FIG. 8 is a flowchart illustrating a method of removing an image blocking artifact using a transformation coefficient, according to an exemplary embodiment.

The method according to the current exemplary embodiment may be realized by a calculation processor, such as an image processing processor or a GPU.

In operation 810, a blocking artifact in a flat region is detected in an input image. The input image may be an image decoded and restored by a decoder.

The blocking artifact in the flat region may be detected based on the BAS of flat blocks of the input image. The BAS according to an exemplary embodiment may be determined based on a difference between DC coefficients of adjacent blocks of a current flat block. Local BASes of the flat blocks are determined, whereas global BAS of the input image is determined based on an average of the local BASes, and when the global BAS exceeds a predetermined threshold value, it may be determined that the blocking artifact is generated in the flat region of the input image.

In operation 820, the blocking artifact in the flat region is removed by using a predetermined number of low frequency coefficients from among transformation coefficients according to blocks, for transformation blocks of the input image based on the result of detecting.

The blocking artifact in the flat region may be removed by compensating for the predetermined number of low frequency coefficients in the transformation coefficients of blocks according to pixels of the input image. The predetermined number of low frequency coefficients may be compensated for according to those in the same coefficient location by classifying the low frequency coefficients in the transformation blocks according to coefficient locations.

Smoothing filtering strength of the blocking artifact in the flat region may be determined by using the local BAS of the flat block determined in operation 810, and smoothing filtering may be variably performed according to a location of the flat block.

The predetermined number of low frequency coefficients from among the transformation coefficients according to blocks of the input image may be replaced with the compensated for low frequency coefficients, and other transformation coefficients of the input image may remain as they are. An image in a transformation region, in which part of the low frequency coefficients are replaced, is inverse transformed according to transformation blocks so as to generate an intermediate image in a spatial region from which a blocking artifact in a flat block is removed.

In operation 830, an edge region is detected from the input image. A transformation block of which the energy of samples is higher than a predetermined threshold value may be detected as the edge block from among transformation blocks of a high frequency band image of the input image.

Edge regions of the input image may be detected, prior to operations for detecting and removing the flat region blocking artifact. In this case, blocking artifacts in flat regions of an image may be detected and, removed from regions which may not be the detected edge regions.

Flat regions and edge regions of the input image may be separately detected.

In operation 840, a blocking artifact in an edge region of an intermediate image is removed based on the detected edge region of the input image, wherein the intermediate image is obtained by removing a blocking artifact in a flat region from the input image. A result image from which the blocking artifact in the edge region is removed may be output after the blocking artifact in the flat region is removed from the input image.

Edge blocks forming the same edge are grouped from among edge blocks of the intermediate image, and 3D orthogonal transformation may be performed on the edge blocks in a group to generate 3D transformation coefficients of the edge blocks in a group. Threshold filtering is performed and then inverse 3D orthogonal transformation is performed on the 3D transformation coefficients of the edge blocks in a group to remove a blocking artifact in the edge blocks in a group. The edge blocks of the intermediate image, on which the 3D orthogonal transformation is performed and then the threshold filtering is performed, may be updated by calculating a weighted average.

The apparatuses 100 and 300 according to the exemplary embodiments may obtain a high quality digital television (DTV) image by effectively reducing a blocking artifact affecting the quality of an image via quantized DCT coefficient compensation. Also, since various types of encoding information is not used to remove an image blocking artifact, a blocking artifact may be effectively removed from uncompressed image data received through a D-sub terminal or Digital Video Interface/High-Definition Multimedia Interface (DVI/HDMI) terminal of a TV.

Specifically, since the apparatuses 100 and 300 use a deblocking post-processing technique that does not involve encoding information, wherein a hardware resource is not required to be added to an encoding and decoding system, the apparatuses 100 and 300 are useful in a deblocking technique on low transmission rate encoding image.

It would be interpreted by one of ordinary skill in the art that the block diagrams described in the exemplary embodiments conceptually indicate a circuit for realizing principles. Similarly, it would be obvious to one of ordinary skill in the art that a predetermined flowchart, a flow graph, a state transition diagram, and a pseudo code are substantially expressed in a computer-readable recording medium and indicate various processes executed by a computer or a processor, even if the computer or processor is not explicitly shown. Accordingly, the exemplary embodiments can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

The functions of various elements shown in diagrams may be provided by using not only hardware for executing software by being related to suitable software, but also exclusive hardware. When the functions are provided by a processor, the functions may be provided by a single exclusive processor, a single common processor, or a plurality of individual processor, wherein some processors are shared. Also, terms "processor" or "controller" shall not be interpreted to exclusively indicate hardware for executing software, and may unlimitedly and implicitly include digital signal processor (DSP) hardware, read-only memory (ROM) for storing software, random access memory (RAM), and nonvolatile storage devices.

Herein, an element expressed as a unit for performing a certain function includes a predetermined method of performing the certain function, and may include a combination of circuit elements for performing the certain function, or software in a predetermined form including firmware or microcode combined to a suitable circuit for executing software for performing the certain function.

In the present specification, "an exemplary embodiment" and other modified expressions mean that a certain feature, structure, and characteristic are included in at least one exemplary embodiment. Accordingly, the expression "an exemplary embodiment" and other modified examples in the present specification may not denote the same exemplary embodiment.

In the present specification, the expression "at least one of A and B" is used to include a selection of only A, only B, or both A and B. Further, the expression "at least one of A through C" may be used to include a section of only A, only B, only C, only A and B, only B and C, or all of A through C. Similar expressions with more elements are also possible.

While exemplary embodiments have been particularly shown and described, it will be understood by those of ordinary skill in the art that various changes in form and details may be made therein. The exemplary embodiments should be considered in a descriptive sense only and not for purposes of limitation.

What is claimed is:

1. A method of removing blocking artifacts in an input image, the method comprising:
   detecting a first blocking artifact which is in a flat region of the input image;
   removing the first blocking artifact using a number of low frequency coefficients from among transformation coefficients for each transformation block of a plurality of transformation blocks of the input image, based on a result of detecting the first blocking artifact;
   detecting an edge region of the input image; and
   removing a second blocking artifact, which is in an edge region of an intermediate image obtained from the removing of the first blocking artifact of the input image, based on the detected edge region in the input image.

2. The method of claim 1, wherein the detecting the first blocking artifact comprises:
   determining flat blocks in the input image; and
   detecting the first blocking artifact based on a blocking artifact strength of the flat blocks.

3. The method of claim 2, wherein the detecting the first blocking artifact based on the blocking artifact strength of the flat blocks comprises determining a current blocking artifact strength of a current flat block based on a difference between direct current coefficients of the current flat block and adjacent blocks from among the flat blocks.

4. The method of claim 2, wherein the detecting the first blocking artifact based on the blocking artifact strength of the flat blocks comprises:
   determining local blocking artifact intensities of the flat blocks;
   determining a global blocking artifact strength of the input image based on an average of the local blocking artifact intensities of the flat blocks; and
   determining that the blocking artifact is generated in the flat region of the input image if the global blocking artifact strength exceeds a threshold value.

5. The method of claim 1, wherein the removing the first blocking artifact comprises:
   determining the transformation coefficients according to pixels of the input image by transforming pixels in a block unit including a current pixel and having a predetermined size, for each of the pixels of the input image; and
   compensating for the number of low frequency coefficients from among the transformation coefficients according to pixels, for the each of the pixels of the input image.

6. The method of claim 5, wherein the removing the flat block artifact in the flat region comprises:
   replacing the transformation coefficients according to blocks, which are obtained by dividing the input image in units of the transformation blocks and transforming pixels in each of the transformation blocks, with the compensated for low frequency coefficients; and
   generating an intermediate image in a spatial region by inverse transforming the transformation coefficients of the input image according to the transformation blocks.

7. The method of claim 5, wherein the compensating for the number of low frequency coefficients comprises:
   generating low frequency coefficient images, in which low frequency coefficients from among the number of low frequency coefficients which are in a same coefficient location are arranged in an order of a corresponding block, for coefficient locations of the low frequency coefficients, by classifying the number of low frequency coefficients according to coefficient locations in the transformation blocks; and
   removing the first blocking artifact for each of the low frequency coefficient images generated according to the coefficient locations in the transformation blocks.

8. The method of claim 6, wherein the replacing the transformation coefficients according to blocks, which are obtained by dividing the input image in block units with the compensated for low frequency coefficients, comprises:
   extracting low frequency coefficients of blocks in a same location as the transformation blocks of the input image, from among the compensated for low frequency coefficients; and
   replacing low frequency coefficients in a same location as the extracted low frequency coefficients, from among the low frequency coefficients of the transformation blocks of the input image, with the extracted low frequency coefficients.

9. The method of claim 4, wherein the removing the first blocking artifact comprises determining a smoothing filtering strength for removing the first blocking artifact, for each of the flat blocks, based on the local blocking artifact intensities of the flat blocks, and removing the first blocking artifact based on the determined smoothing filtering strength.

10. The method of claim 4, wherein the removing the first blocking artifact comprises determining a filtering strength of total variation filtering for removing the first blocking artifact based on the local blocking artifact intensities of the flat blocks, and removing the first blocking artifact by performing the total variation filtering based on the determined filtering strength.

11. The method of claim 1, wherein the detecting the edge region in the input image comprises:
    generating a low frequency band image by inverse transforming an image that includes the number of low frequency coefficients for transformation blocks of the input image, wherein other coefficients are 0; and
    generating a high frequency band image by subtracting the low frequency band image from the input image.

12. The method of claim 11, wherein the detecting the edge region in the input image further comprises determining a transformation block of which the energy of samples is higher than a threshold value from among transformation blocks of the high frequency band image, as an edge block.

13. The method of claim 12, wherein the energy of samples is an average of absolute values of the transformation coefficients of the transformation blocks or an average of absolute values of pixel values of the transformation blocks.

14. The method of claim 1, wherein the removing the second blocking artifact comprises:
    grouping edge blocks forming a same edge, from among edge blocks of the edge region of the intermediate image, in correspondence to the edge region of the input image;
    performing a three-dimensional (3D) orthogonal transformation on the edge blocks in each group resulting from the grouping; and
    removing the second blocking artifact by using 3D transformation coefficients of the edge blocks in each group resulting from the grouping.

15. The method of claim 14, wherein the removing of the blocking artifact of the edge blocks using the 3D transformation coefficients of the edge blocks in each group comprises performing threshold filtering for transforming the 3D transformation coefficients to 0 if the 3D transformation coefficients are less than a threshold value.

16. The method of claim 14, wherein the removing of the blocking artifact of the edge blocks using the 3D transformation coefficients of the edge blocks in each group comprises:
performing threshold filtering on the 3D transformation coefficients;
restoring the edge blocks in each group by performing an inverse 3D orthogonal transformation on the 3D transformation coefficients on which the threshold filtering is performed; and
updating the edge region detected in the intermediate image based on the restored edge blocks.

17. The method of claim 16, wherein the updating of the edge region detected in the intermediate image based on the restored edge blocks comprises updating the edge region by determining a weighted average block with respect to edge blocks in an overlapping region from among edge blocks restored by performing the 3D orthogonal transform, the threshold filtering, and the inverse 3D orthogonal transformation according to a plurality of groups.

18. The method of claim 1, further comprising receiving the input image, wherein the input image is decoded and restored by a decoder.

19. An apparatus for removing image blocking artifacts in an input image, the apparatus comprising:
a flat region blocking artifact detector that detects a first blocking artifact that is in a flat region of the input image;
a flat region blocking artifact remover that removes the first blocking artifact by using a number of low frequency coefficients from among transformation coefficients according to blocks, for each of transformation blocks of the input image based on a result of the detection by the flat region blocking artifact detector;
an edge region detector that detects an edge region in the input image; and
an edge region blocking artifact remover that removes a second blocking artifact, which is in an edge region of an intermediate image, obtained by removing the first blocking artifact of the input image, based on the detected edge region in the input image.

20. The apparatus of claim 19, wherein the flat region blocking artifact detector determines flat blocks in the input image, and detects the first blocking artifact based on a blocking artifact strength of the flat blocks.

21. The apparatus of claim 20, wherein the flat region blocking artifact detector determines a current blocking artifact strength of a current flat block based on a difference between direct current coefficients of the current flat block and adjacent blocks from among the flat blocks.

22. The apparatus of claim 20, wherein the flat region blocking artifact detector:
determines local blocking artifact intensities of the flat blocks;
determines a global blocking artifact strength of the input image based on an average of the local blocking artifact intensities of the flat blocks; and
determines that the blocking artifact is generated in the flat region of the input image if the global blocking artifact strength exceeds a threshold value.

23. The apparatus of claim 19, wherein the flat region blocking artifact remover determines transformation coefficients according to pixels of the input pixels by transforming pixels in a block unit including a current pixel and having a predetermined size, for each of the pixels of the input image, and compensates for the number of low frequency coefficients from among the transformation coefficients for the each of the pixels of the input image.

24. The apparatus of claim 23, wherein the flat region blocking artifact remover replaces the transformation coefficients according to blocks with the compensated for low frequency coefficients, for the transformation blocks of the input image, and generates an intermediate image in a spatial region by inverse transforming the transformation coefficients of the input image for each of the transformation blocks.

25. The apparatus of claim 23, wherein the flat region blocking artifact remover generates low frequency coefficient images, in which low frequency coefficients from among the number of low frequency coefficients which are in a same coefficient location are arranged in an order of a corresponding block, for coefficient locations of the low frequency coefficients, by classifying the number of low frequency coefficients according to coefficient locations in the transformation blocks, and removes the first blocking artifact in flat blocks for each of the low frequency coefficient images generated according to the coefficient locations.

26. The apparatus of claim 24, wherein the flat region blocking artifact remover extracts low frequency coefficients of blocks in a same location as the transformation blocks of the input image, from among the compensated for low frequency coefficients, and replaces low frequency coefficients in a same location as the extracted low frequency coefficients, from among the low frequency coefficients of the transformation blocks of the input image, with the extracted low frequency coefficients.

27. The apparatus of claim 22, wherein the flat region blocking artifact remover determines a smoothing filtering strength for removing the blocking artifact according to the flat blocks based on the local blocking artifact intensities of the flat blocks, and removes the first blocking artifact based on the determined smoothing filtering strength.

28. The apparatus of claim 22, wherein the flat region blocking artifact remover determines a filtering strength of total variation filtering for removing the first blocking artifact based on the local blocking artifact intensities of the flat blocks, and removes the first blocking artifact by performing the total variation filtering based on the determined filtering strength.

29. The apparatus of claim 19, wherein the edge region detector generates a low frequency band image by inverse transforming an image that includes the number of low frequency coefficients for transformation blocks of the input image, and
wherein other coefficients are 0, and generates a high frequency band image by subtracting the low frequency band image from the input image.

30. The apparatus of claim 29, wherein the edge region detector determines a transformation block, of which the energy of samples is higher than a predetermined threshold value from among transformation blocks of the high frequency band image, as an edge block.

31. The apparatus of claim 30, wherein the energy of samples is an average of absolute values of the transformation coefficients of the transformation blocks or an average of absolute values of pixel values of the transformation blocks.

32. The apparatus of claim 19, wherein the edge region blocking artifact remover groups edge blocks forming a same edge, from among edge blocks of the edge region of the intermediate image, in correspondence to the edge region of the input image, performs a three-dimensional (3D) orthogonal transformation on the edge blocks in each group grouped by the edge region blocking artifact remover, and removes the blocking artifact of the edge blocks by using 3D transformation coefficients of the edge blocks in each group grouped by the edge region blocking artifact remover.

33. The apparatus of claim 32, wherein the edge block blocking artifact remover performs threshold filtering for transforming the 3D transformation coefficients to 0 if the 3D transformation coefficients are less than a threshold value.

34. The apparatus of claim 32, wherein the edge block blocking artifact remover performs threshold filtering on the 3D transformation coefficients; restores the edge blocks in each group by performing an inverse 3D orthogonal transformation on the 3D transformation coefficients on which the threshold filtering is performed, and updates the edge region detected in the intermediate image based on the restored edge blocks.

35. The apparatus of claim 34, wherein the edge block blocking artifact remover updates the edge region by determining a weighted average block with respect to edge blocks in an overlapping region from among edge blocks restored by performing the 3D orthogonal transform, the threshold filtering, and the inverse 3D orthogonal transformation according to a plurality of groups.

36. The apparatus of claim 19, wherein the input image is decoded and restored by a decoder.

37. A computer-readable recording medium having recorded thereon a program for executing the method of claim 1.

38. A method of removing blocking artifacts in an input image, the method comprising:
   detecting at least one first blocking artifact, which is in a flat region of the input image, based on a first threshold comparison;
   transforming blocks of the input image, wherein the transforming generates transformation coefficients for each transformed block of the input image;
   extracting low frequency coefficients from among the transformation coefficients generated from the transforming;
   generating low frequency coefficient images based on the extracted low frequency coefficients;
   generating compensated low frequency coefficient images by filtering the at least one first blocking artifact from the generated low frequency coefficient images;
   extracting compensation coefficients from the compensated low frequency coefficient images; and
   generating an intermediate image by inverse transforming the compensated low frequency coefficient images.

39. The method of claim 38, further comprising:
   detecting at least one edge block in the intermediate image based on a second threshold comparison;
   performing a three-dimensional (3D) transformation on groups of edge blocks, which form a same edge, from among the at least one edge block detected in the intermediate image;
   filtering 3D transformation coefficients resulting from the 3D transformation;
   performing an inverse 3D transformation based on a result of the filtering of the 3D transformation coefficients; and
   generating a final image based on the performing of the inverse 3D transformation.

* * * * *